Nov. 20, 1951 G. T. SIMMONS 2,575,401
SAFETY LOCK DEVICE
Filed Sept. 23, 1949 2 SHEETS—SHEET 1
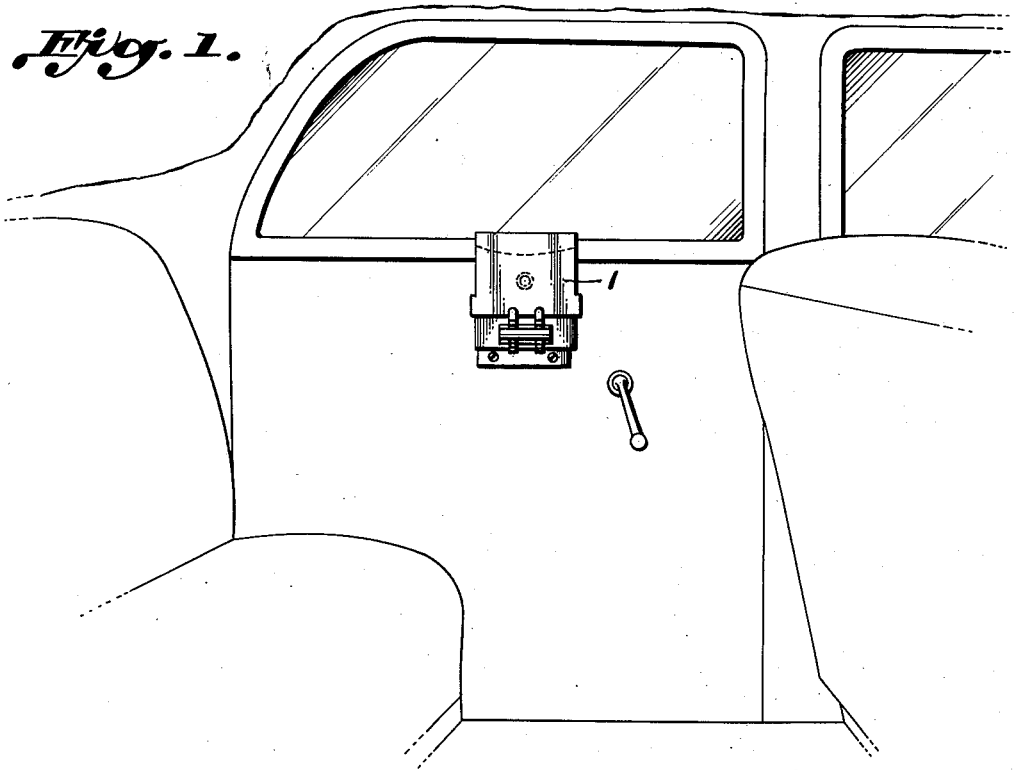
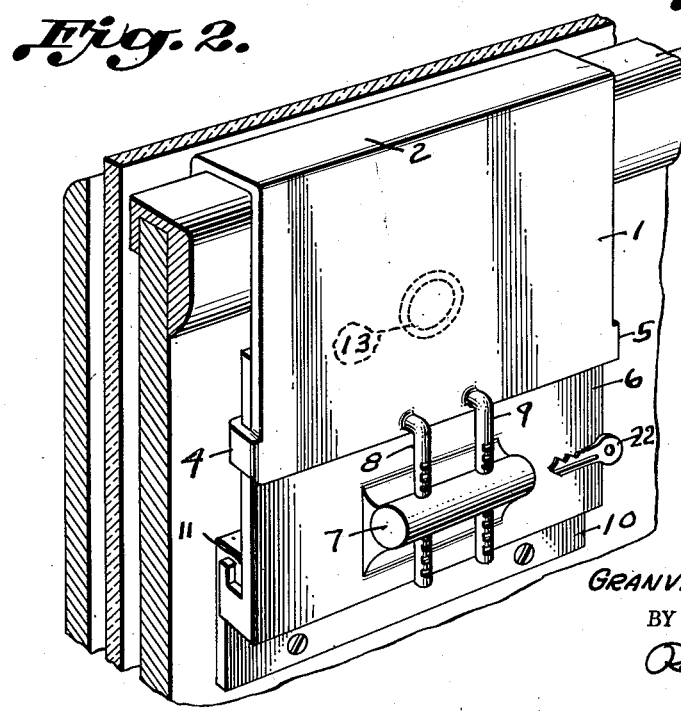
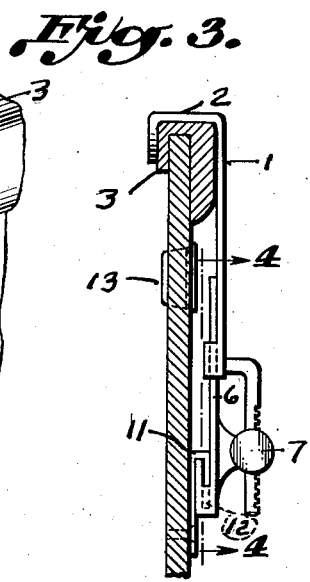
INVENTOR.
GRANVILLE TOM SIMMONS
BY
ATTORNEY Nov. 20, 1951 G. T. SIMMONS 2,575,401
SAFETY LOCK DEVICE
Filed Sept. 23, 1949 2 SHEETS—SHEET 2
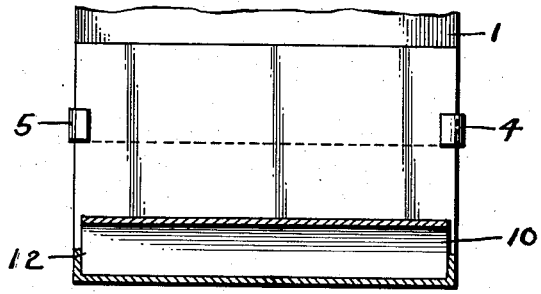
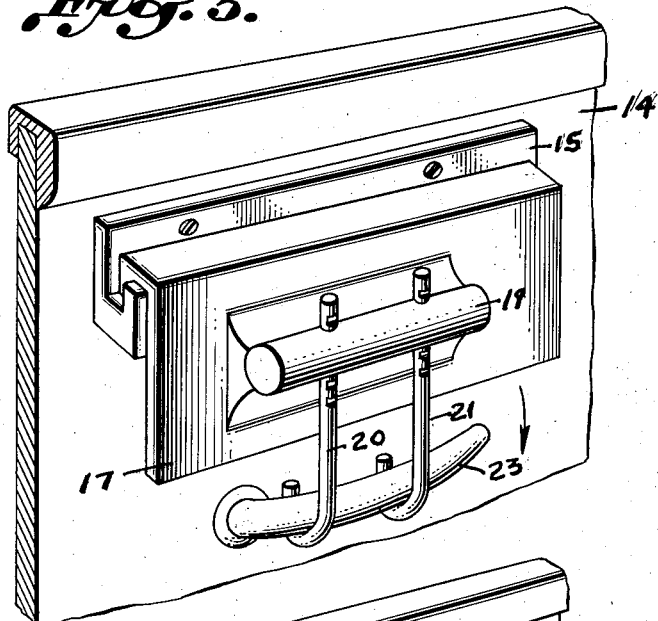
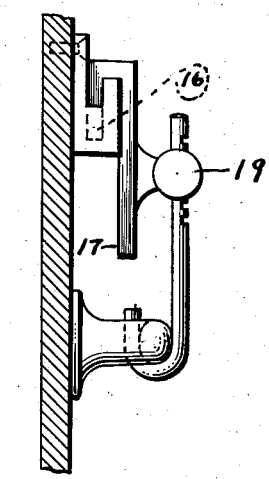
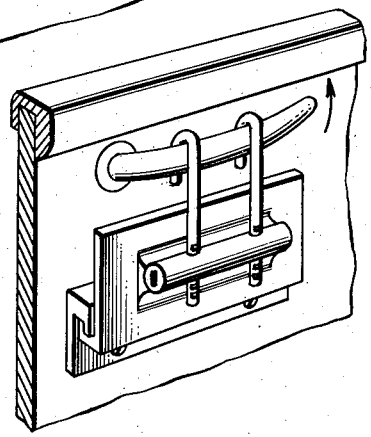
INVENTOR.
GRANVILLE TOM SIMMONS
BY
ATTORNEY Patented Nov. 20, 1951

2,575,401

UNITED STATES PATENT OFFICE 2,575,401

SAFETY LOCK DEVICE

Granville Tom Simmons, Richmond, Va.

Application September 23, 1949, Serial No. 117,300

2 Claims. (Cl. 70—211)

This invention relates to a safety lock device, and more particularly to the type used in connection with automobiles and the like.

One of the hazards to which persons riding in automobiles, and especially children, are subjected to is the opening of the automobile doors while the car is in motion; thereby providing means for such rider to fall from the car. The usual automobile is provided with doors having handles or buttons both on the inside and outside, and when persons are riding in a car they may accidentally move the inside door handles, thereby causing the door to open. It is therefore obvious that such a hazard is very dangerous to riders, and this invention eliminates it.

One of the objects of this invention is the provision of a safety lock adapted to engage the handle of an automobile door to prevent its being moved to an open position.

Another object of this invention is the provision of a safety lock to secure an automobile door handle so that it cannot be moved to open position until such device is unlocked.

A further object of this invention is the provision of a safety lock adapted to guard the door opening means, such as a button, of an automobile, and thus prevent anyone from opening such door by said means until the device is unlocked.

Other objects and features will more fully appear from the following description and accompanying drawings, in which:

Fig. 1 is a perspective of the device as applied to the interior of an automobile door;

Fig. 2 an enlarged frontal perspective of said safety lock;

Fig. 3 a side sectional view of Fig. 2;

Fig. 4 a rear view taken along lines 4—4 of Fig. 3;

Fig. 5 a modification of said safety lock;

Fig. 6 a side view of Fig. 5; and

Fig. 7 an inverted view of the locking device shown in Fig. 5.

Referring to the drawings, an apron 1 is provided with a shoulder 2 adapted to engage a sill 3 on an automobile door. The apron is provided with guides 4—5 (Fig. 4) into which is slidably mounted a plate 6 having secured thereto a lock 7.

Projecting downwardly from said apron are notched rods 8—9 that are adapted for sliding in and out of apertures in said lock as shown in Fig. 2. A U-shaped bracket 10 is secured to the automobile door and its end 11 (Figs. 3-4) registers with a trough 12 thereby preventing any substantial or material lateral displacement. The device as illustrated in Figs. 1 through 4 is adapted to placement over a button type door latch 13 which opens the door.

Referring to the modification an automobile door 14 has secured thereto a U-shaped bracket 15 which forms a trough 16. An apron 17 has a U-shaped shoulder, the free end of which is adapted for disposition in said trough. A lock 19 is mounted on apron 17 and a pair of notched hook-like bars 20—21 (Fig. 5) register with and are slidable in and out of said lock. A key 22 such as shown in Fig. 2 is used to lock and unlock said bars for securement and removal thereof.

The hook portions of bars 20—21 are adapted for engagement with a handle 23 on the door of an automobile. As shown in Fig. 5 the handle is adapted to move in the direction of the arrow in order to open the door. It is therefore obvious that when the bars are secured in the lock and the hooks thereon engaging the bottom portion of the handle it cannot move downwardly to open the door until said bars are released from the lock by a key.

Fig. 7 is similar in structure to Fig. 5 except that in the case of an automobile door handle being moved in the direction of arrow to open the door the device is inverted and thus prevents this type of handle from opening said door.

Having described the invention, what is claimed is:

1. In a device of the character described the combination consisting of a bracket secured to a door of an automobile; an apron supported by said bracket and having a lock mounted thereon; bars adapted for disposition in said lock and to secure a door handle of an automobile against actuation in the direction required to open said door.

2. In a device of the character described the combination consisting of a bracket provided with a trough and adapted to be secured to a door of an automobile in close proximity to an automobile door handle; an apron having one of its ends provided with a trough and adapted for registration with said first named trough; a lock secured to said apron and provided with apertures into which are adapted for respective disposition a pair of bars having a hook on each of their ends; said bars adapted to be secured in said lock and engage said handle so as to prevent the latter from actuation in the direction required to open said door.

GRANVILLE TOM SIMMONS.

REFERENCES CITED

The following references are of record in the file of this patent:

UNITED STATES PATENTS

| Number | Name | Date |
|---|---|---|
| 2,165,775 | Winslow | July 11, 1939 |

FOREIGN PATENTS

| Number | Country | Date |
|---|---|---|
| 94,655 | Austria | Oct. 25, 1923 |

OTHER REFERENCES

Popular Mechanics magazine, Nov. 1941, page 159.